United States Patent Office 3,229,467
Patented Jan. 18, 1966

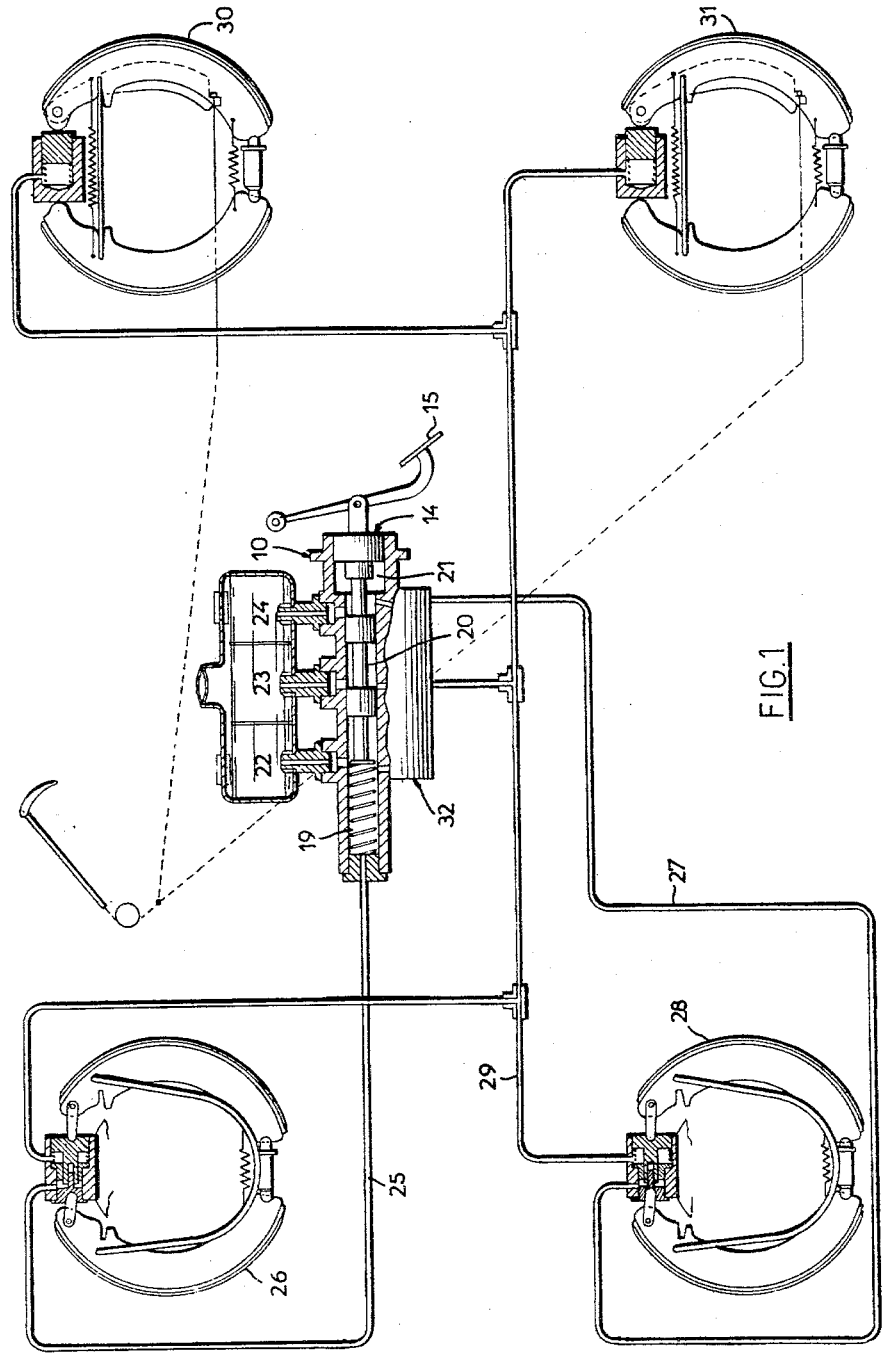

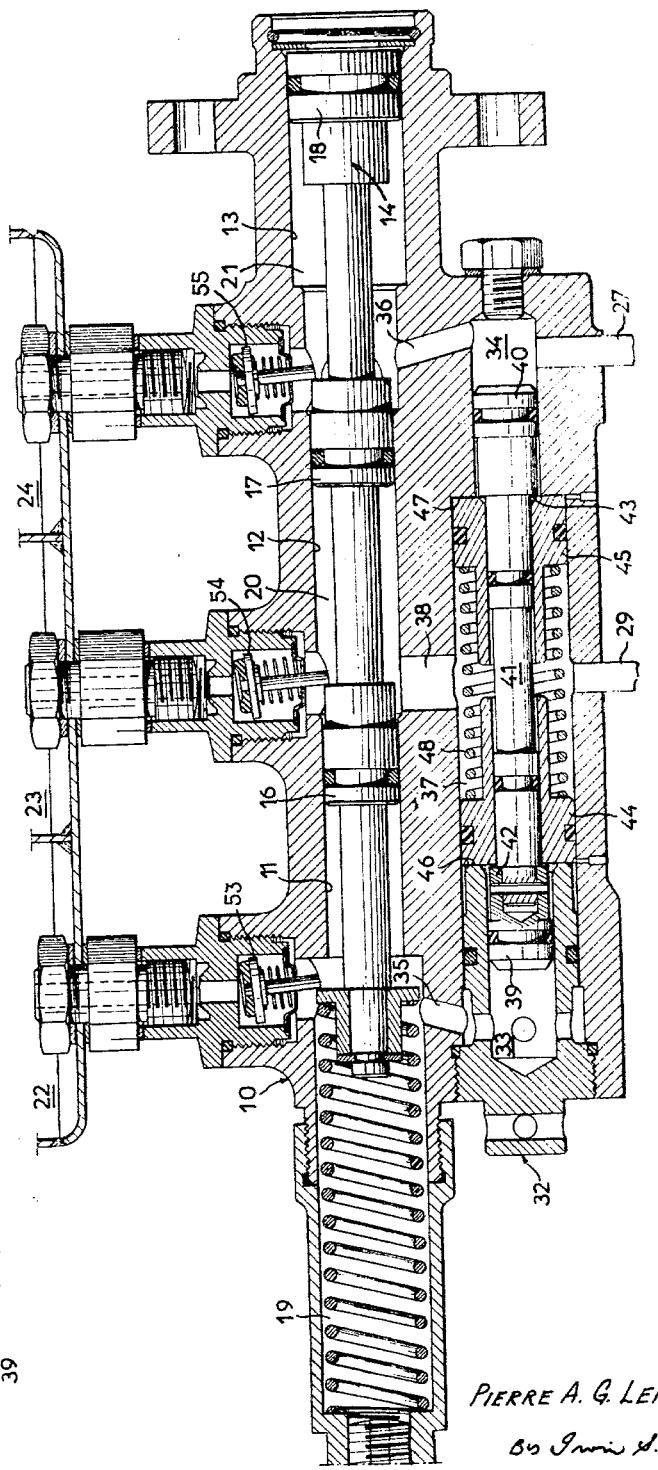

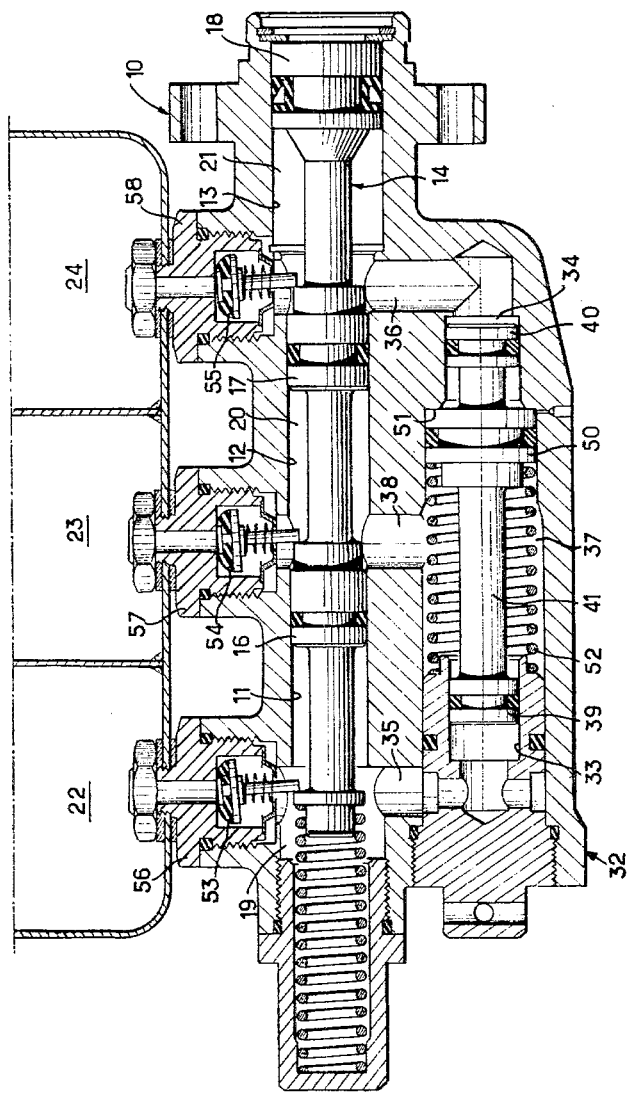

3,229,467
HYDRAULIC BRAKES HAVING A SAFETY
DEVICE
Pierre André Georges Lepelletier, Chatou, France, assignor to Societe Anonyme Francaise du Ferodo, Paris, France, a corporation of France
Filed Feb. 27, 1964, Ser. No. 347,790
Claims priority, application France, Mar. 5, 1963, 926,832; July 15, 1963, 941,449
10 Claims. (Cl. 60—54.5)

The present invention relates to hydraulic brakes having a safety device, comprising a master-cylinder for delivering substantially equal volumes of fluid to at least two primary conduits which are permanently isolated from each other and which lead respectively to two brakes, a secondary circuit balancing the reactions of these two brakes, and a pressure coupling means which is responsive to the pressure of the secondary circuit and which acts on the pressures of the primary conduits in such manner as to leave the primary pressures independent of each other when the secondary pressure is sufficiently high and to make the primary pressures substantially equal when the secondary pressure is sufficiently low, for example in the case of rupture of the secondary circuit or when in reverse gear.

A device of this kind is described for example in the United States Patent No. 3,044,581.

The known devices of the kind referred to above which have the advantage of establishing an equilibrium of the primary pressures in the event of failure of the secondary circuit, or in reverse gear, have however the disadvantage that in this eventuality they result in a reduction of the travel of the master-cylinder.

The present invention has for its object the provision of hydraulic brakes of the type referred to above, having a safety device which is free from this disadvantage.

This device is particularly characterized in that the pressure coupling means comprises a rod on which are rigidly fixed two end pistons, a first end chamber which is connected to the first of the primary conduits and in which is engaged the first of the end pistons of the rod, a second end chamber which is connected to the second primary conduit and in which is engaged the second end piston of the rod, a central chamber which is connected to the secondary circuit and through which the rod passes, and blocking means in the central chamber which are responsive to the secondary pressure, so as to immobilize the rod when the secondary pressure is sufficiently high, and to free the rod when the secondary pressure is sufficiently low.

In one form of embodiment in which the volumes delivered into the two primary conduits by the master-cylinder are preferably arranged to be exactly equal, the blocking means comprise two central pistons which are movable with respect to each other and which are engaged in the central chamber, two spaced-apart abutment members formed on the rod, two other abutment members spaced apart and fixed, the distance separating the two abutments on the rod being equal, within the tolerances of manufacture, to that which separates the two fixed abutments, one of the central pistons co-operating with one of the abutments of the rod and with one of the fixed abutments, while the other central piston co-operates with the other abutment of the rod and with the other fixed abutment.

In an alternative form in which the substantially-equal volumes delivered into the two primary conduits by the master-cylinder are slightly different, so that the volume delivered into the first primary conduit is slightly greater than that delivered into the second primary conduit, the two end pistons of the rod have substantially the same diameter, and the blocking means comprise a central piston which is rigidly fixed to the rod and which has a diameter appreciably greater than that of the end piston, the movable walls of the central chamber being constituted by the central piston and by the second end piston.

The characteristic features and advantages of the invention will furthermore be brought out from the description which follows below of forms of embodiment chosen by way of example, reference being made to the accompanying drawings, in which:

FIG. 1 is a general diagram of a braking installation on a vehicle, to which is aplied the safety device in accordance with the invention;

FIG. 2 is a view in longitudinal section of the master-cylinder and of the pressure coupling station;

FIG. 3 shows this latter station in a further position of operation;

FIG. 4 is a view similar to that of FIG. 2 but relating to an alternative form of construction.

Reference will first be made to FIGS. 1 to 3. The master-cylinder 10 (FIGS. 1 and 2) which drives a practically incompressible fluid such as oil, comprises in the example shown three cylindrical bores in line: a front bore 11, an intermediate bore 12 and a rear bore 13, of increasing diameters.

In the bores 11, 12 and 13 is mounted a sliding unit 14 actuated by the brake pedal 15. The unit 14 comprises a piston 16 sliding in the bore 11, a piston 17 sliding in the bore 12 and a piston 18 sliding in the bore 13. In front of the forward piston 16 is formed a primary chamber 19. Between the piston 16 and 17 is defined a secondary chamber 20. Between the pistons 17 and 18 is formed another primary chamber 21. The various chambers 19, 20 and 21 are connected to reservoirs 22, 23 and 24 through the intermediary of clapper valves 53, 54 and 55 which are rocked by the unit 14.

The master-cylinder 10 is of the kind in which, when the unit 14 is displaced by the action of the pedal 15, substantially equal volumes are driven into the chambers 19 and 21. In the example shown in FIGS. 1 to 3, the master-cylinder 10 is arranged in such manner that these delivered volumes are exactly equal.

The chamber 19 is connected to a primary conduit 25 which is coupled to one of the front brakes 26 of the vehicle, while the chamber 21 is coupled to a primary conduit 27 which is connected to the other front brake 28 of the vehicle.

A secondary circuit 29 is provided to balance the braking reactions on the front axle when equal volumes are driven into the conduits 25 and 27. To this end, the circuit 29 is connected to the front brakes 26 and 28, which are provided for a double supply, both primary and secondary. The secondary circuit 29 is also connected to the rear brakes 30 and 31 which are provided for a single supply.

The secondary chamber 20 of the master-cylinder 10 is connected to the secondary circuit 29.

During normal braking operation for forward running, equal volumes are driven into the primary conduits 25 and 27 and produce a braking reaction which is balanced by the secondary circuit 29 in which the pressure becomes very high. In order not to interfere with such a balancing action, it is essential that the primary pressures may have different values, if so required, or in other words that these pressures are independent. On the contrary, in the event of rupture of the secondary circuit 29 or during the course of braking in reverse running, it is necessary to re-establish equality of the primary pressures so as to be able to take advantage of a balancing action, doubtless much less effective than before, but still acceptable.

According to the invention, a safety device is provided for that purpose and its action is such that in the event of rupture of the secondary circuit or during the course of braking in reverse running, there is no resulting loss of travel of the pedal 15.

This safety device comprises a pressure coupling means 32 responsive to the pressure of the secondary circuit 29. The means 32 acts on the pressures in the primary chambers 19, 25 and 21, 27 in such manner as to make the primary pressures substantially equal when the secondary pressure is sufficiently low, for example in the case of rupture of the secondary circuit or in reverse gear, and to leave the primary pressures independent of each other when the secondary pressure is sufficiently high. The means 32 is preferably incorporated in the master-cylinder 10.

The means 32 comprises two primary end chambers 33 and 34 which communicate respectively at 35 and 36 with the chambers 19 and 21, and a central secondary chamber 37 which communicates at 38 with the chamber 20.

Two primary end pistons 39 and 40 engage respectively in the chambers 33 and 34 and are coupled together by a rod 41. The assembly 39–41–40 forms a rigid but movable system. A shoulder 42 separates the piston 39 from the rod 41 and forms an abutment, while a shoulder 43 separates the piston 40 from the rod 41 and forms another abutment.

Two central secondary pistons 44 and 45, in the form of sleeves, are engaged in a fluid-tight manner around the rod 41 and are movable with respect to each other. These pistons are engaged in the secondary chamber 37. The piston 44 co-operates with the abutment 42 of the system 39–41–40, while the piston 45 co-operates with the abutment 43 of the said system 39–41–40.

Two fixed abutments 46 and 47 are also provided and are formed by shoulders which separate the chamber 37 from the chamber 33 and the chamber 34 respectively. The piston 44 co-operates with the fixed abutment 46, while the piston 45 co-operates with the fixed abutment 47. The distance separating the two abutments 42 and 43 from the system 39–41–40 is equal, within the tolerances of manufacture, to that which separates the two fixed abutments 46 and 47. A spring 48 is interposed between the two pistons 44 and 45 and tends to separate them until they are applied against the fixed abutments 46 and 47.

During the course of normal braking during forward running, the high secondary pressure which exists in the chamber 37 forces the pistons 44 and 45 (FIG. 2) strongly against the fixed abutments 46 and 47, which immobilizes the moving system 39–41–40 and leaves the two primary pressures independent.

When the secondary pressure is low, for example in the case of rupture of the circuit 29 or during braking in reverse gear, the system 39–41–40 is freed and acquires a degree of freedom towards the right or towards the left, for example towards the right, as shown in FIG. 3, which makes the primary pressures equal, to within the calibration of the spring 48, and this without any loss of travel of the pedal 15 being recorded.

Reference will now be made to FIG. 4, in which the arrangement is similar to that which has just been described with reference to FIGS. 1 to 3, but in which the substantially equal volumes driven through the chambers 19 and 21 during the depression of the pedal 15 have a slight but systematic difference with respect to each other, so that one is constantly slightly greater than the other.

In the example shown in FIG. 4, it is the chamber 21 which delivers a volume slightly greater than that which is delivered by the chamber 19. To this end, it is only necessary that the section of the bore 13 should be suitably chosen with respect to the sections of the bores 11 and 12. For example, the volume delivered by the chamber 21 may be 10% greater than that delivered by this chamber in the case of FIG. 2, while the volume delivered by the chamber 19 may be 10% less than that delivered by this latter chamber in the case of FIG. 2.

The passage 35 communicates with the end chamber 33, in which is slidably mounted an end piston 39 which is rigidly fixed by the rod 41 to the other end piston 40 and to a central piston 50. The piston 40 is slidably mounted in the other end chamber 34 with which the passage 36 communicates, while the piston 50 is slidably mounted in the central chamber 37 with which the passage 38 communicates. The bore of the chamber 37 which receives the piston 50 has a diameter substantially greater than that of each of the bores of the chambers 33 and 34 which receive the pistons 39 and 40. The bore of the chamber 34 receiving the piston 40 has a diameter slightly greater than that of the bore of the chamber 33 which receives the piston 39. The unit 39–41–50–40 is returned into abutment against the shoulder 51 by a spring 52.

During normal braking operation in forward running, substantially equal volumes are driven from the chambers 19 and 21 into the primary conduits 25 and 27, but as the volume delivered by the chamber 21 is slightly greater than that delivered by the chamber 19, the brake 28 comes into braking contact slightly before the brake 26, which in practice would not prove troublesome, since the reaction very rapidly puts the secondary circuit 29 under high pressure. This high pressure is transmitted to the central chamber 37 and strongly applies the piston 50 of the unit 39–41–50–40 in abutment against the shoulder 51. In this way, as before, the primary pressures at 25 and 27 are made independent and the balancing of the reactions by the secondary circuit 29 can be carried out freely.

When the secondary pressure is low, for example in reverse running or if the secondary circuit 29 were to break, the brake 28 comes into mechanical abutment on the secondary side before the brake 26, so that a one-way compensation, effected by the unit 39–41–50–40, which is permitted to move towards the left of FIG. 4 after leaving the abutment 51, re-establishes an equilibrium of the primary pressures at 25 and 27. As the section of the bore of the chamber 34 is slightly greater than that of the bore of the chamber 33, the load of the return spring 52 can be substantially compensated in the vicinity of the working pressures employed.

It will be observed that the construction of the unit 39–41–50–40 is particularly simple and enables any loss of travel of the pedal to be avoided in the event of rupture of the secondary circuit, since the volume of oil supplied by the chamber 21 for pushing down the piston 40 is substantially recovered by the chamber 19, by virtue of the corresponding movement of the piston 39.

In the construction shown in FIG. 4, it will be noted that the clapper valves 53, 54 and 55 are mounted in short vertical couplings 56, 57 and 58, on which the compartmented tank 22, 23 and 24 is directly mounted. It will be observed that the passages 35, 36 and 38 connecting the end chambers 33 and 34 and the central chamber 37 of the station 32 with the main chambers 19, 21 and 20 of the master-cylinder 10 have large sections. These passages 35, 36 and 38 are perpendicular to the axis of the main piston assembly 14 and are respectively aligned with the couplings 56, 57 and 58.

It will of course be understood that the invention is not limited to the forms of construction described and shown, but includes all its alternative forms.

What I claim is:

1. Hydraulic brakes having a safety device, comprising two brakes, a primary conduit in communication with each of said brakes, a master cylinder for delivering fluid to said primary conduits, a secondary fluid circuit for balancing the reactions of said two brakes, and pressure-coupling means responsive to the fluid pressure in said secondary circuit to render the pressures of the fluid in the primary conduits independent of each other when said secondary fluid pressure is sufficiently high and to render said primary fluid pressures substantially equal to each other when said secondary fluid pressure is sufficiently low, said pressure-coupling means comprising a rod, a pair of spaced pistons on the rod, a first chamber communicating with one of said primary conduits, one of said pistons being slidably disposed in said first chamber, a second chamber communicating with the other of said primary conduits, the other of said pistons being slidably disposed in said second chamber, a central chamber communicating with said secondary circuit and traversed by said rod, and locking means responsive to said secondary fluid pressure to immobilize said rod when the secondary pressure is sufficiently high and to free said rod when the secondary pressure is sufficiently low.

2. Hydraulic brakes as claimed in claim 1, in which said locking means comprises two central pistons movable with respect to each other and slidable in said central chamber, two abutments disposed and spaced apart on said rod, and two fixed abutments, the distance between the two abutments on the rod being substantially equal to the distance between the two fixed abutments, one of the central pistons being adapted to contact one of the abutments on the rod and one of the fixed abutments, the other of the central pistons being adapted to contact the other abutment on the rod and the other fixed abutment.

3. Hydraulic brakes as claimed in claim 1, said master cylinder being adapted to deliver substantially equal volumes of fluid to both of said primary conduits.

4. Hydraulic brakes as claimed in claim 2, in which each said central piston is in the form of a sleeve and is slidably disposed on said rod.

5. Hydraulic brakes as claimed in claim 2, and spring means interposed between said two central pistons and continuously urging said central pistons apart.

6. Hydraulic brakes as claimed in claim 1, said two pistons having substantially the same diameter, said locking means comprising a central piston rigidly fixed to said rod and having a diameter substantially greater than that of either of said two pistons, said central chamber having movable walls constituted by said central piston and one of said two pistons.

7. Hydraulic brakes as claimed in claim 6, said master cylinder being adapted to deliver slightly different volumes of fluid to each of said primary conduits.

8. Hydraulic brakes as claimed in claim 6, and spring means for resiliently fixing the axial position of said rod.

9. Hydraulic brakes as claimed in claim 8, in which the diameter of one of said two pistons is slightly greater than the diameter of the other of said two pistons so as to compensate, in the absence of pressure in the central chamber, for the load of said spring means.

10. Hydraulic brakes as claimed in claim 1, in which said pressure-coupling means is disposed in said master cylinder, the master cylinder having main chambers, a main piston unit in said main chambers, the first and second and central chambers of said pressure-coupling means communicating with the main chambers of said master cylinder through wide passages that are perpendicular to the axis of said rod, reservoir means communicating with said main chambers, and couplings between said reservoir means and said master cylinder, said couplings being axially aligned with said wide passages.

References Cited by the Examiner

UNITED STATES PATENTS 3,044,581   7/1962   Lepelletier _____ 60—54.5 X

SAMUEL LEVINE, *Primary Examiner.*

ROBERT R. BUNEVICH, *Examiner.*